Patented Nov. 11, 1952

2,617,767

UNITED STATES PATENT OFFICE 2,617,767

OIL BASE DRILLING FLUIDS

Paul W. Fischer, Long Beach, Calif., assignor to Union Oil Company of California, Los Angeles, Calif., a corporation of California No Drawing. Application October 21, 1950, Serial No. 191,505

10 Claims. (Cl. 252—8.5)

This invention relates to oil base drilling fluids, and in particular concerns oil base drilling fluids especially adapted for use in drilling through highly porous formations.

In drilling oil or gas wells by means of rotary drilling tools, a hollow drill pipe known as a drill stem having a bit attached to its lower end is extended downwardly through the well bore and rotated while the bit is pressed against the working face in the formation at the bottom of the hole. The action of the rotating bit grinds away the formation as the drilling progresses. During the drilling, a fluid body known as a drilling fluid or mud is continuously circulated downwardly through the drill stem, through the bit and against the working face of the hole, and thence upwardly through the annular space between the drill stem and the wall of the bore. The drilling fluid serves a number of purposes, among which are cooling and lubricating the drill bit, suspending and removing cuttings from the bore hole, preventing the flow of liquids from formations traversed by the bore into the same by applying a hydrostatic pressure to such formations, and fulfilling other purposes.

In locations where the underground formations traversed and/or penetrated by the bore contain materials such as hydratable clays which swell and/or disintegrate in the presence of water, it has become customary to employ drilling fluids which are more or less free of water in order to preclude the introduction of water into the bore by means of the drilling fluid. Such drilling fluids are termed "oil-base" fluids since they usually comprise a mineral oil or a water-in-oil emulsion having dispersed or suspended therein minor proportions of various agents adapted to impart special properties to the composition. Among such agents, the most universally employed are: weighting agents, which are high density inert solids adapted to increase the apparent density of the base oil and thus increase the hydrostatic head provided by the drilling fluid within the bore; wall-building agents, which are materials such as clay or asphalt adapted to coat or plaster the walls of the bore with an impermeable layer which prevents the escape of the drilling fluid into permeable formations; and dispersing agents which serve to maintain solid components of the fluid uniformly dispersed therein. Oil base drilling fluids may also comprise a variety of other agents such as gel strength improvement agents, viscosity modifiers, emulsifying agents, protective colloids, inorganic salts, etc.

Among the various general types of oil base drilling fluids which have been proposed those in which the wall-building agent comprises a hydratable clay such as bentonite and the dispersing agent comprises an oil-dispersible metal soap have met with wide commercial acceptance. Such fluids are very readily prepared from relatively inexpensive ingredients, certain of which are often available right at the well site. They are very stable with respect to flocculation, and are not subject to bacterial attack. They have excellent viscosity and gel strength characteristics, and under normal conditions of operation have good fluid loss properties. The latter is an expression of the ability of the fluid to coat or plaster the walls of the bore with a thin impermeable layer of solids which prevents the escape of the fluid into permeable formations traversed by the bore, and constitutes one of the most important attributes of the fluid. It is conveniently measured by determining the so-called "fluid loss value" of the fluid by the procedure described in "Recommended Practice on Standard Field Procedure for Testing Drilling Fluids," API Code No. 29, July 1942. According to such procedure, a sample of the drilling fluid is forced under a pressure of about 100 lbs. per sq. in. and at a temperature of about 100° F. against a filter paper which closes the bottom of the vessel in which the sample is contained. The volume of liquid which passes through the filter in a given period of time, usually one hour, is measured and expressed in milliliters as the fluid loss value of the sample. Ordinarily, it is desirable that a drilling fluid have a fluid loss value of less than about 8 ml./hr. at 100° F.

In most oil-producing localities the nature of the subsurface strata through which the wells are drilled is such that the fluid loss characteristics of the fluid during drilling are closely indicated by the fluid loss value of the fluid as determined by the above-described test. Thus, a drilling fluid which has an API fluid loss value of, say, 8.0 ml./hr. or less, will in most instances of actual use prove highly satisfactory from the standpoint of loss of fluid to the formation. However, in certain locations, one or more of the subsurface strata may be so highly porous that large quantities of the drilling fluid are lost to the formation even though the fluid may have an API fluid loss value of as low as zero. In order that the fluid loss test value may provide a more accurate description of the behavior of the fluid when used in drilling through highly porous formations, the standard API fluid loss value determination has been modified by replacing the filter paper against which the fluid is forced by a 1½ inch thick layer of clean 20–30 mesh sand. Otherwise the test method is unchanged. As an indication of the severity of the modified test, it may be noted that a high quality soap-stabilized oil base drilling fluid which had a fluid loss value of 0.0 ml./hr. as determined by the standard test method was found to have a fluid loss value of about 600 ml./min. as determined by the modified test method. Such a drilling fluid, while highly satisfactory for use in most drilling localities, is not satisfactory for use in localities wherein highly porous subsurface strata occur. In general it has been found that a drilling fluid of the present type should have a modified fluid loss test value of about 90 ml./hr. or less if it is to be satisfactory for use in highly porous formations.

Inasmuch as the fluid loss properties of the present type of drilling fluid are imparted thereto by the clay wall-building agent, and to some extent by the soap stabilizing agent, it would appear that the fluid loss value could be decreased to a satisfactory figure by increasing the proportion of clay or soap in the composition. However, when sufficient clay is employed to attain the desired low fluid loss value the viscosity of the composition is increased to such an extent that it is entirely inoperable as a drilling fluid. Similarly, the use of large amounts of soap only slightly improves the fluid loss properties and very adversely affects other desirable properties of the fluid as well as render its cost prohibitive.

It is accordingly an object of the present invention to provide oil base drilling fluids adapted for use in drilling through highly porous formations.

Another object is to provide means for modifying certain types of commercially available oil base drilling fluids in order to adapt them for use in drilling through highly porous formations.

A further object is to provide oil base drilling fluids having exceptionally low fluid loss characteristics.

A still further object is to provide oil base drilling fluids whose fluid loss values determined by the herein described modified test method are comparable to the fluid loss values determined by the standard test method.

Other objects will be apparent from the following detailed description of the invention, and various advantages not specifically referred to herein will occur to those skilled in the art upon employment of the invention in practice.

I have now found that the above and related objects may be realized in drilling fluids essentially comprising a soap-stabilized mineral oil dispersion of a hydratable clay, water, and the substantially petroleum hydrocarbon insoluble resin derived from pine wood. Such drilling fluids may be prepared by combining the individual components or by forming the soap components in situ as hereinafter more fully described. Alternatively, they may be obtained simply by adding the pine wood resin to a commercial drilling fluid of the type comprising a soap-stabilized mineral oil dispersion of a hydratable clay and water. The manner in which the pine wood resin functions to provide the exceptionally low fluid loss properties in the composition is not understood, but it appears that the resin has a unique affinity for the particles of the formation and for the soap and/or clay components of the composition, and in some way provides a bond between the formation and such components of the fluid. Through the use of relatively small amounts of such resin as herein disclosed it has been found possible to prepare drilling fluids having a modified fluid loss value of as low as 0.0 ml./hr. Ordinary soap-stabilized oil base drilling fluids have modified fluid loss values of the order of 600 ml./min. or higher. In addition to their exceptional fluid loss properties which render them adapted for use in highly porous formations, the compositions of the invention have highly satisfactory viscosity and gel strength characteristics, and in general possess all of the aforementioned desirable properties of the soap-stabilized type of drilling fluid. The resin component is inexpensive, and use of such resin even in relatively large proportions does not add materially to the cost of the composition.

The essence of the invention thus lies in the incorporation of a minor proportion of the hereinafter described substantially petroleum hydrocarbon pine wood resin in drilling fluids which comprise a major proportion of a mineral oil having dispersed therein minor proportions each of a hydratable clay, water and an oil-dispersible metal soap.

Components

The base oil which forms a major component of the new drilling fluid compositions is preferably of mineral origin and may be crude petroleum or a distillate or residuum material. Heavier materials such as light tars, cracked residua, heavy extracts and the like are especially well suited, particularly when blended with a light distillate such as gas oil, diesel fuel, etc. A highly satisfactory mixed base of this type comprises a major proportion, e. g., 60–95 per cent, of a relatively heavy oil such as a light residual oil having a specific gravity of about 13°–15° API and a viscosity of about 30–40 SSF at 122° F. and containing substantial amounts of asphaltenes, polymeric bodies and the like, and a minor proportion, e. g., 5–40 per cent, of a light distillate oil such as a diesel fuel having a specific gravity of about 25°–35° API and a viscosity of about 30–50 SUS at 100° F. The invention, however, is not limited to the use of any particular type of oil or mixtures thereof, and any of the oil bases known in the art may be satisfactorily employed.

The oil-dispersible metal soap component which serves to maintain the solid components dispersed in the base oil and to control fluid loss properties may be any of the metal soaps heretofore employed for such purpose in the formulation of oil base drilling fluids. Preferably, such soaps are alkaline-earth metal soaps of terpenic or long-chain unsaturated aliphatic carboxylic acids, although soaps of other types of acids, e. g., naphthenic and sulfonic acids, may also be employed. Rosin acid soaps, particularly the alkaline-earth metal soaps of modified rosin acids, have been found to be of especial value. Modified rosin acids are well-known in the naval stores art, and are obtained by treating rosin in various ways to modify the resin acids contained therein. For example, wood rosin may be heated under non-oxidizing conditions at temperatures between about 250° and about 350° C. for a length of time sufficient to increase its specific rotation to a value above about +5°. The resulting product closely resembles the original rosin in appearance, but is considerably altered chemically as evidenced by its increased dehydroabietic acid content, lower iodine number, etc. By carrying out the heat treatment at somewhat higher temperatures and/or over longer periods of time, the specific rotation may be raised further and the iodine number further decreased. Under such drastic conditions decarboxylation of the rosin takes place with the formation of unsaponifiable bodies which are usually referred to as rosin oils. Another type of modified rosin is obtained by heating the rosin at relatively low temperatures in the presence of a hydrogenation catalyst but in the absence of added hydrogen as described in U. S. Patent 2,154,629. The reaction which takes place is termed "disproportionation" since it involves the simultaneous hydrogenation and dehydrogenation of abietic-type acids with the consequent formation of dihydroabietic and dehydroabietic acids and their analogues, and the resulting product is referred to in the naval stores art as "disproportionated rosin." Similarly, the product obtained by heating rosin under conditions sufficiently drastic that carboxyl groups are removed from the rosin acids is known as "decarboxylated rosin," and the product obtained by heat-treating rosin under less drastic conditions so that the change effected is primarily one of molecular rearrangement is known as "isomerized rosin." The alkaline-earth metal soaps of all of such modified rosin products, together with the alkaline-earth metal soaps of long-chain unsaturated aliphatic acids, e. g., oleic, linolic, linolenic, palmitolic and elaeostearic acids and mixed acids such as tall oil acids, form a preferred class of soaps for use in preparing the compositions of the invention, although as previously stated any of the oil-dispersible metal soaps heretofore employed in oil base drilling fluid compositions may be employed.

If desired, the oil-dispersible metal soap component may be employed as such in preparing the compositions of the invention. However, it is usually preferred that the soap be formed in situ by metathesis between the corresponding alkali-metal soap and an alkaline-earth metal base, e. g., calcium oxide, calcium hydroxide, barium hydroxide, strontium hydroxide, calcium acetate, etc. Calcium hydroxide, e. g. ordinary hydrated lime, and calcium oxide are preferred by reason of their low cost and general availability. The manner in which the metathesis reaction is carried out is more fully described hereinafter, as well as in U. S. Patents Nos. 2,542,019 and 2,542,020. An alkali-metal soap which has been found particularly suited to such technique is the alkali-metal alkali saponification product of wood rosin which has been heat-treated at temperatures between about 250° and about 350° C. in the absence of a catalyst to such an extent that it contains only about 50–60 per cent of free resin acids, 30–40 per cent of unsaponifiable oils, and small amounts of phenolic materials, water and products of unknown constitution. A second preferred soap of this nature is the product obtained by heating rosin at a temperature of about 225°–300° C. for about 15–60 minutes in contact with a hydrogenation catalyst but in the absence of added hydrogen, distilling the resulting product and collecting a fraction distilling at about 210°–275° C. under about 5–10 mm. pressure, and thereafter saponifying such fraction with aqueous sodium hydroxide in the known manner. Such product is available commercially under the trade name "Dresinate 731."

The hydratable clay component is preferably a high quality material such as bentonite, montmorillonite, or kaolinite, but may be common clay such as is available in almost any locality. Bentonite is preferred. Similarly, the water component should be relatively pure or "fresh," since water containing substantial amounts of dissolved inorganic salts, e. g., salt brines and the like, has an adverse effect on the properties of the composition.

The material which is herein, as well as in the naval stores art, referred to as "the substantially petroleum hydrocarbon insoluble pine wood resin" is the resinous material which may be isolated from pine wood, preferably from stump pine wood, in the following manner: The pine wood, which may or may not have been steamed to remove volatile constituents such as turpentine and pine oil, is extracted with a coal tar hydrocarbon such as benzene or toluene, and the extract is then freed of volatile constituents leaving a resinous residue consisting of a mixture of wood rosin and the resin used in the present compositions. Extraction of this residue with a petroleum hydrocarbon, such as gasoline, dissolves and removes the rosin. After separation of the rosin, which is high in abietic acid, a resinous residue remains which is low in abietic acid and which comprises the resin employed according to the present invention. Alternatively, the residue of the initial coal tar hydrocarbon extract may be treated with a mixture of a petroleum hydrocarbon and furfural, and the two layers which form are separated. The petroleum hydrocarbon insoluble resin is found dissolved in the furfural, from which it may be separated by evaporation of the furfural. Other known methods of isolating this resin may be employed, and if desired it may be steamed or heat-treated to remove volatile constituents.

This resinous material is characterized by a dark red-brown color, cherry red in solution, and by substantial insolubility, i. e., 85 per cent or greater, in petroleum hydrocarbons, but it will vary somewhat in its specific characteristics, such as acid number, melting point, solubility in aromatic hydrocarbons, etc., depending upon the details of the extraction process utilized. However, it will usually meet the following specifications: Substantial insolubility in petroleum hydrocarbons, substantially complete solubility in alcohol, a methoxy content from about 3 to about 7.5 per cent (usually from about 4 to about 6 per cent), an acid number between about 80 and about 110, and a drop melting point between about 95° C. and about 125° C. In practicing the present invention, this resin is employed in finely-divided form, preferably 100-mesh or finer.

In addition to the foregoing essential components, the drilling fluids of the invention will usually also comprise a weighting agent. Suitable weighting agents include finely-divided whiting, barytes, iron oxides, lead dust, fuller's earth, calcined clay, calcium carbonate and other high density inert solids, and such agent may be employed in amounts sufficient to provide compositions having apparent densities from 65 lbs./cu. ft. to as high as 130 lbs./cu. ft.

Proportions

The proportions in which the various essential ingredients are employed in preparing the new compositions may be varied between rather wide limits depending upon the identity of such components and the specific properties desired in the composition. Ordinarily, however, the oil-dispersible metal soap is employed in an amount representing between about 1 and about 10, preferably between about 4 and about 8, per cent by weight of the entire composition. When such soap is prepared in situ by metathesis of an alkali-metal soap and an alkaline-earth metal base, the alkali-metal soap is employed in substantially these same proportions and the base is employed in an amount corresponding approximately to that chemically equivalent to the alkali-metal soap present. When the alkali-metal soap is one of the preferred products hereinbefore described and the alkaline-earth metal base is calcium oxide or hydroxide, the soap is provided in the above-mentioned amount and the base is employed in an amount representing between about 0.1 and about 5, preferably between about 0.4 and about 2, per cent by weight of the entire composition. The pine wood resin will comprise between about 2 and about 20 per cent by weight of the entire composition. The hydratable clay is employed in an amount representing between about 0.1 and about 5, preferably between about 0.4 and about 1.2, per cent by weight of the entire composition, and the water is provided in an amount representing between about 0.2 and about 10, preferably between about 1 and about 5, per cent by weight of the entire composition. These proportions of water include any water which may be contained in the soap and/or other components, and accordingly the amount of water actually added during preparation of the composition will be adjusted according to the water content of the other components so that the final composition contains water in the above-mentioned proportions.

Procedure

The exact manner in which the soap, hydratable clay, water and pine wood resin are dispersed in the base oil is not of primary importance, and if desired the requisite amounts of each of the ingredients may simply be added to the entire quantity of the base oil at ordinary temperatures while employing more or less vigorous agitation or stirring to secure a uniform composition. Such operation may be carried out at the well site in the conventional mud pits with agitation being effected by circulating the mixture from one pit to another. However, it is often more convenient to prepare an initial concentrate composition which can subsequently be diluted with the base oil to obtain the finished drilling fluid. Thus, the soap, resin, clay and water may be dispersed in a portion of the base oil to form a relatively thick viscous composition which can be stored and shipped in drums, and subsequently be diluted with the remainder of the base oil to obtain the finished product. When the base oil comprises a mixture of a light and heavy oil, it is preferred that the light oil be employed in forming the initial dispersion.

As previously mentioned, the oil-dispersible metal soap may be formed in situ by metathesis between the corresponding alkali-metal soap and an alkaline-earth metal base. Such procedure is often preferred since it eliminates preparing the alkaline-earth metal soap by a separate step in the many instances in which only the alkali-metal soap of the desired acid is available commercially. More importantly, the drilling fluids prepared by such procedure are often superior with respect to stability and fluid loss properties, possibly because the metathesis reaction does not usually go to completion and the fluid may accordingly contain some unreacted alkali-metal soap in addition to the alkaline-earth metal soap. Inasmuch as the extent of the metathesis reaction can not accurately be determined, and the relative proportions of the water-dispersible and oil-dispersible metal soaps are thus unknown, the compositions prepared in this manner can be accurately described only in terms of their method of preparation. When employing such procedure, the various components, including the alkaline-earth metal base, may simply be dispersed in the base oil with the aid of efficient agitation. Alternatively, the alkaline-earth metal base may be suspended in a portion of the base oil, after which the alkali-metal soap is added with vigorous stirring. The hydratable clay, water, and resin are then added, and stirring is continued to obtain a homogeneous concentrate composition which may subsequently be diluted with the remainder of the base oil. Also, if desired, the concentrate composition may comprise only the alkali-metal soap, resin, clay and water dispersed in a portion of the base oil, with the alkaline-earth metal base being added along with the remainder of the base oil at some subsequent time. Weighting agents, gel strength agents and other optional components are usually added along with or subsequent to dilution of the concentrate to form the finished product.

Usually, the drilling fluid compositions of the invention will be prepared by combining the individual components thereof as just described. However, they may also be obtained by suitably modifying previously prepared compositions of the proper type. Thus, any of the drilling fluids which comprise a soap-stabilized mineral oil dispersion of a hydratable clay and water may be modified to improve their fluid loss properties simply by adding the pine wood resin in the proportions given above.

In the following table are presented data which demonstrate the effectiveness of the pine wood resin in providing drilling fluids of the present type with exceptionally low fluid loss properties. The table also includes comparative data with respect to other agents which have been suggested for such use or which are superficially comparable to the pine wood resin. In each of the experiments set forth in the table, the indicated proportion of the stated addition agent was incorporated into 2000 ml. sample of the drilling fluid with vigorous stirring to insure a homogeneous composition, after which the fluid loss value was determined by the modified method hereinbefore described. The determination was made at a temperature of 210° F., and the filter consisted of 200 gms. of clean dry 20–30 mesh sand spread in an even layer on the bottom of the standard API mud cylinder. The base drilling fluid was a commercial product which had been prepared by dispersing minor amounts of alkali-metal soaps of modified rosin, bentonite, water, and lime in a mixture of a light diesel fuel and a light fuel oil as hereinbefore described. This base fluid had a standard API fluid loss value of less than about 1.0 ml./hr. at 250° F.

Table

| Experiment No. | Addition Agent | | Fluid Loss |
|---|---|---|---|
| | Identity | Percent | |
| 1 | None (Blank) | 0 | 100 ml./10 sec. |
| 2 | Pulverized Pine Wood Resin. | 2 | 93 ml./hr. |
| 3 | ----do---- | 4.8 | 3.8 ml./hr. |
| 4 | ----do---- | 9.5 | 0.0 ml./hr. |
| 5 | Flaxseed Meal | 2 | 100 ml./6 sec. |
| 6 | Starch | 2 | 200 ml./hr. |
| 7 | Super Cell | 2 | 100 ml./8 sec. |
| 8 | Pulverized Urea-Formaldehyde Resin. | 2 | 100 ml./8 sec. |
| 9 | Pulverized Acrylate Resin. | 2 | 100 ml./55 sec. |
| 10 | Tall Oil Soap | 2 | 100 ml./5 sec. |
| 11 | Bentonite | 2 | 100 ml./5 sec. |
| 12 | Whiting | 9.5 | 100 ml./7 sec. |
| 13 | Pulverized Barium Sulphate. | 9.5 | 100 ml./7 sec. |

It will be noted from these data that although the base drilling fluid is indicated to have highly satisfactory fluid loss properties by its low standard fluid loss value, such fluid is in fact shown by its very high modified fluid loss value to be unsatisfactory for use in drilling through porous formations. However, the addition of only 2 per cent of the pine wood resin to the base fluid reduced the modified fluid value to an operable magnitude, and addition of about 10 per cent of the resin reduced the modified fluid loss value to zero. In some instances a somewhat greater proportion of the resin may be required to reduce the modified fluid loss value to such an extent. It will also be noted that of the various addition agents tested only the pine wood resin was effective in reducing the fluid loss by any substantial degree.

The following examples will illustrate several ways in which the principle of the invention may be applied, but are not to be construed as limiting the same. All proportions are given in parts or per cent by weight.

Example I

A typical soap-stabilized oil base drilling fluid is prepared by dispersing 6750 parts of Dresinate 731, 1400 parts of water and 2180 parts of bentonite in a mixed base oil comprising 4780 parts of light diesel fuel and 2800 parts of light fuel oil. The light diesel fuel is a typical 400°–720° F. boiling range petroleum fraction, and has an API gravity of about 31° and a viscosity of about 40 SUS at 100° F. The fuel oil is a heavier fraction having an API gravity of about 14.5° and a viscosity of about 36 SSF at 122° F. Approximately 3700 parts of the resulting concentrate composition are diluted with about 33,000 parts of the fuel, and there is then added about 76 parts of hydrated lime. The resulting mixture is stirred for about ½ hour, whereby the lime and sodium soap react by metathesis to form the corresponding calcium soap. About 4000 parts of the pine wood resin are then stirred into the composition, and the product is stored until ready for use.

Example II

| | Per cent by weight |
|---|---|
| Light mineral oil (36° API) | 19.0 |
| Heavy mineral oil (15° API) | 65.6 |
| Saponified decarboxylated rosin | 4.0 |
| Water | 4.0 |
| Bentonite | 2.0 |
| Calcium oxide | 0.4 |
| Pulverized pine wood resin | 5.0 |
| | 100.0 |

The saponified decarboxylated rosin product is the potassium hydroxide saponification product of decarboxylated rosin obtained by heating wood rosin at about 280°–320° C. for 2–4 hours. It is a dark-colored highly viscous fluid comprising about 50 per cent of the potassium soaps of modified rosin acids, about 7 per cent of unsaponified rosin acids, about 33 per cent of unsaponifiable rosin oils and about 10 per cent of water. The mixing procedure is the same as that employed in Example I.

Example III

| | Per cent by weight |
|---|---|
| Crude petroleum (18° API) | 76.0 |
| Sodium tall oil soap | 8.0 |
| Bentonite | 5.0 |
| Water | 2.0 |
| Hydrated lime | 1.5 |
| Pulverized pine wood resin | 7.5 |
| | 100.0 |

Example IV

| | Per cent by weight |
|---|---|
| Light mineral oil (22° API) | 78.0 |
| Calcium oleate | 8.0 |
| Bentonitic clay | 1.0 |
| Water | 3.0 |
| Pulverized pine wood resin | 10.0 |
| | 100.0 |

Example V

| | Per cent by weight |
|---|---|
| Light petroleum distillate (40° API) | 23.0 |
| Residual oil (12° API) | 60.0 |
| Calcium naphthenate | 9.0 |
| Montmorillonite | 0.5 |
| Water | 1.0 |
| Pulverized pine wood resin | 4.0 |
| Aqueous sodium silicate (40%) | 2.5 |
| | 100.0 |

The composition is weighted to an apparent density of 120 lbs./cu. ft. by the addition of 200-mesh whiting.

Various modifications within the scope of the invention will be apparent to those skilled in the art. Such modifications may include the use of specific hydratable clays, various types of weighting agents, viscosity modifiers, gel strength improvement agents, and various types and blends of base oils, as well as various oil-dispersible metal soap stabilizing agents. The principle of the invention, i. e., the use of the pine wood resin as herein explained, may also be applied to other types of drilling fluids, e. g., a drilling fluid comprising a mineral oil dispersion of asphalt stabilized by a base such as calcium oxide.

Other modes of applying the principle of my invention may be employed instead of those explained, change being made as regards the materials or procedure employed, provided the compositions or steps stated by any of the following claims, or the equivalent of such stated compositions or steps be obtained or employed.

I, therefore, particularly point out and distinctly claim as my invention:

1. An oil-base drilling fluid essentially comprising a mineral oil having dispersed therein between about 1 and about 10 per cent by weight of an oil-dispersible metal soap, between about 0.1 and about 5 per cent by weight of a hydratable clay, between about 0.2 and about 10 per cent by weight of water, and between about 2 and about 20 per cent by weight of finely-divided substantially petroleum hydrocarbon insoluble pine wood resin.

2. The composition of claim 1 wherein the soap is an oil-dispersible metal rosin soap.

3. The composition of claim 1 wherein the soap is an oil-dispersible calcium rosin soap.

4. An oil-base drilling fluid prepared by dispersing in mineral oil between about 1 and about 10 per cent by weight of an alkali-metal soap, an amount of an alkaline-earth metal base approximately equivalent chemically to said alkali-metal soap, between about 0.1 and about 5 per cent by weight of a hydratable clay, between about 0.2 and about 10 per cent by weight of water, and between about 2 and about 20 per cent by weight of finely-divided substantially petroleum hydrocarbon insoluble pine wood resin.

5. The composition of claim 4 wherein the alkaline-earth metal base is selected from the class consisting of calcium hydroxide and calcium oxide.

6. The composition of claim 5 wherein the alkali-metal soap is an alkali-metal rosin soap.

7. An oil-base drilling fluid prepared by dispersing in mineral oil between about 1 and about 10 per cent by weight of an alkali-metal rosin soap, between about 0.1 and about 5 per cent by weight of an alkaline-earth metal base selected from the class consisting of calcium hydroxide and calcium oxide, between about 0.1 and about 5 per cent by weight of a hydratable clay, between about 0.2 and about 10 per cent by weight of water, and between about 2 and about 20 per cent by weight of finely-divided substantially petroleum hydrocarbon insoluble pine wood resin.

8. The composition of claim 7 wherein the alkali-metal soap is an alkali-metal alkali saponification product of rosin which has been heat-treated under conditions of time and temperature sufficient to raise its specific rotation to a value above about $+5°$.

9. The composition of claim 7 wherein the alkali-metal soap is the sodium hydroxide saponification product of the material obtained by heating rosin at a temperature between about 225° and about 300° C. in contact with a hydrogenation catalyst but in the absence of added hydrogen and thereafter distilling the resulting product and collecting the fraction distilling at about 210°–275° C. under 5–10 mm. pressure.

10. The composition of claim 7 wherein the alkali-metal soap is a potassium hydroxide saponification product of decarboxylated rosin and comprises about 50 per cent by weight of potassium soaps of modified rosin acids, about 7 per cent by weight of unsaponified rosin acids, about 33 per cent by weight of unsaponifiable rosin oils, and about 10 per cent by weight of water.

PAUL W. FISCHER.

REFERENCES CITED

The following references are of record in the file of this patent:

UNITED STATES PATENTS

| Number | Name | Date |
|---|---|---|
| 2,542,020 | Fischer | Feb. 20, 1951 |